INVENTOR.
CLINTON D. BURDICK
BY
ATTORNEY

United States Patent Office 3,234,798
Patented Feb. 15, 1966

3,234,798
GYROSCOPIC APPARATUS
Clinton D. Burdick, Great Neck, N.Y., assignor to Sperry Rand Corporation, Great Neck, N.Y., a corporation of Delaware
Filed June 19, 1961, Ser. No. 118,492
6 Claims. (Cl. 74—5.6)

The present invention relates to gyroscopic apparatus and particularly to apparatus including a spring-restrained single-degree-of-freedom gyroscope for providing a measure of the angular displacement, the angular rate of displacement, or the angular acceleration experienced by the gyroscope about its input axis.

This invention is an improvement over that described in U.S. Patent No. 2,752,790 entitled Gyroscopic Apparatus invented by C. S. Draper, which issued July 3, 1956. The present invention provides a spring-restrained single-degree-of-freedom gyroscope which forms the basis of the apparatus to be described. By means of the relatively simple spring type supporting means of the gyroscopic apparatus, it can be readily constructed by comparatively simple manufacturing techniques since it does not require maintaining extremely close mechanical tolerances as are necessary with the gyroscopic apparatus of the aforementioned Patent 2,752,790.

Further, the present apparatus does not float the gyroscopic element nor does it utilize the viscous shear characteristics of the floatation liquid to perform its desired function. By eliminating these requirements, the apparatus of the present invention also eliminates all of the accessory equipment required to maintain the temperature of the liquid substantially constant in order to maintain the viscosity and shear forces substantially constant to provide consistent performance. The present invention therefore permits the manufacture of a relatively simple, inexpensive basic unit which may be stored indefinitely until it is utilized in conjunction with its associated electrical servo equipment to provide the desired measure.

Another feature of the present invention is that the spring flexure supports act not only as resilient constraining members with respect to the gyroscopic unit but also function to exert a resilient torque on the gyroscopic unit.

Another feature of the present invention is that the damping term for the gyroscopic unit with respect to its case is generated by the servo in response to a derivative of the pick-off signal which is less complex than providing a separate damping means and utilizes the flexure supports for the dual purposes explained above.

It is a primary object of the present invention to provide gyroscopic apparatus which is not only versatile by being capable of performing more than one function but is also relatively simple and inexpensive to manufacture as well as being compact and reliable under varying temperature and environmental conditions.

It is an additional object of the present invention to provide a gyroscopic apparatus capable of providing a variety of measures of its input motion which utilizes a spring element for both constraining and torquing purposes.

Referring to the drawings.

Figure 1:
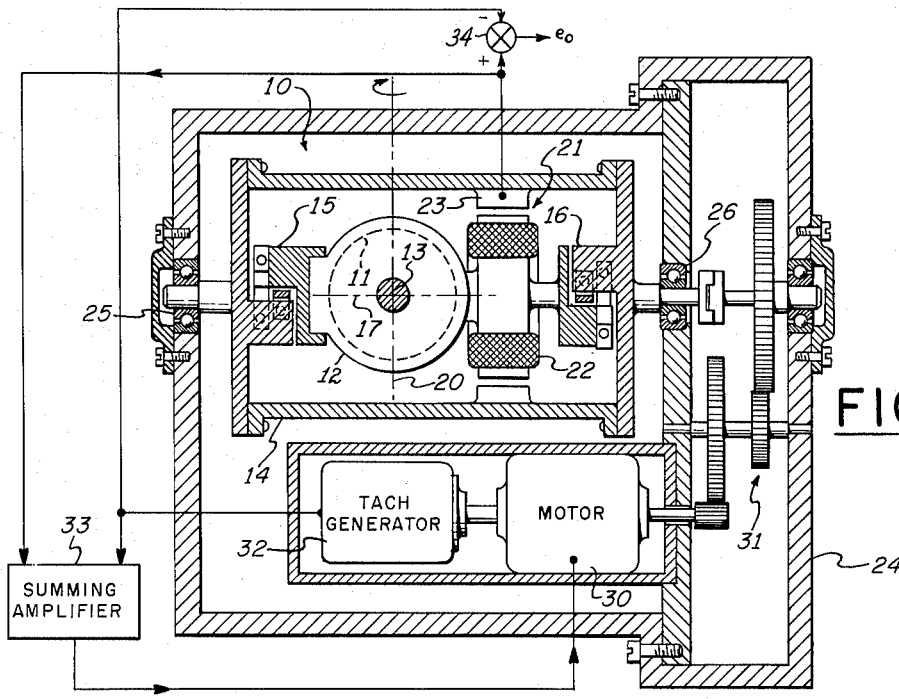
FIG. 1 is a schematic drawing of a single-degree-of-freedom gyroscope connected to a servo system to provide a measure of angular acceleration.

In FIG. 1, a single-degree-of-freedom gyroscope 10 is shown having a gyroscopic rotor 11, indicated by dotted lines, mounted for spinning within a rotor casing 12 about a first or spin axis 13 which is perpendicular to the plane of the paper. The rotor casing 12 is pivotally mounted within a hollow cylindrical support or housing member 14 by means of spaced first and second flexure pivots 15 and 16 for rotation about a second or output axis 17. By this arrangement the rotor casing 12 is adapted for precession through an angle dependent upon the angular velocity experienced by the rotor 11 about a third or input axis 20. The first, second and third axes 13, 17 and 20 respectively are mutually perpendicular with respect to each other. The flexure pivots or springs 15 and 16 resiliently constrain the rotor casing 12 for pivotal movement about the second axis 17 and also apply a resilient torque to the rotor casing 12 in a manner to be more fully explained.

A pick-off 21 has its rotor 22 mounted on the rotor casing 12 for movement therewith while its stator windings 23 are secured to the housing 14 thereby providing a signal having an amplitude and phase representative of the magnitude and direction respectively of the relative angular displacement between the rotor casing 12 and the housing 14.

The housing 14 is rotatably supported on a base 24 for rotation about its axis of revolution which is coincident with the second axis 17 by means of spaced bearings 25 and 26. The housing 14 is rotated by a servomotor 30 mounted on the base 24. The servomotor 30 is connected to drive the housing 14 through a gear train 31. The motor 30 is directly connected to drive a tachometer generator 32. The pick-off 21 is connected through a summing amplifier 33 to the servomotor 30 and to an algebraic summation device 34. The tachometer generator 32 is also connected to the summing amplifier 33 in feedback fashion thereby causing the motor-generator set to function as an electromechanical integrator. The tachometer generator 32 is further connected to the algebraic summation device 34 to oppose the signal from the pick-off 21.

In the operation of this embodiment of the present invention, an angular velocity applied around the input axis 20 of the gyroscope 10 causes precession of the rotor casing 12 resulting in a torque about the output axis 17. This torque is restrained by the torsion of the flexure pivots 15 and 16. The angular rotation of the rotor casing 12 with respect to the housing 14 is sensed by the pick-off 21 which provides a signal accordingly. This signal after being amplified in the amplifier 33 drives the motor 30. The motor 30 drives through the gear train 31 to rotate the housing 14 in a direction tending to reduce the signal from the pick-off 21 to zero. For a constant angular rate applied around the input axis 20, the torque applied through the flexure pivots 15 and 16 will cause the housing 14 and rotor casing 12 to assume a fixed angular error and produce a constant output signal from the pick-off 21. However, for a constant angular rate applied around the input axis 20, the tachometer generator signal will also achieve the same steady rate value and have a magnitude equal to the signal from the pick-off 21 and an opposite polarity. These signals when subtracted in the algebraic summation device 34 produce a zero output signal $e_0$ for a constant rate input. For an angular acceleration applied around the input axis 20, the difference between the pick-off signal and the tachometer generator signal provides an output signal $e_0$ having an amplitude and phase representative of the magnitude and direction of the angular acceleration experienced by the gyroscope 10.

The dynamic response of the rotor casing 12 and the housing 14 is that of a second order undamped system. In the described mechanization there is no physical restraint proportional to the relative velocity between the rotor casing 12 and the housing 14. Therefore for a step function input angular rate about the input axis 20, the output axis 17 would, in the absence of the present invention, produce an undesirable sinusodial oscillation.

The present invention uses the servo drive of the housing 14 and the relative twist in the flexure supports 15 and 16 to provide a torque proportional to the velocity between rotor casing 12 and housing 14 to produce damping about the output axis 17 between the rotor casing 12 and the housing 14. This damping term is generated by providing a relative twist between the rotor casing 12 and the housing 14 of such a magnitude as to make the damping of a second order system consisting of the inertia of the rotor casing 12 and the spring constants of the flexure supports 15 and 16 about one-half of the critical damping. The servo loop consisting of the pick-off 21, the amplifier 33, the servomotor 30, the tachometer 32, the gear train 31 and the housing 14 provides a relative twist in flexure supports 15 and 16 proportional to the electrical input signals thereto. With a derivative of the signal from the pick-off 21 generated in the summing amplifier 33 in addition to amplification of the signal from the pick-off 21 and with the relative magnitudes thereof adjusted correctly, the above damping signal for the second order system between the rotor casing 12 and the housing 14 will then be provided. This damping signal must be used in all configurations of the unit whether it is designed to measure rates, accelerations or displacements.

Figure 2:
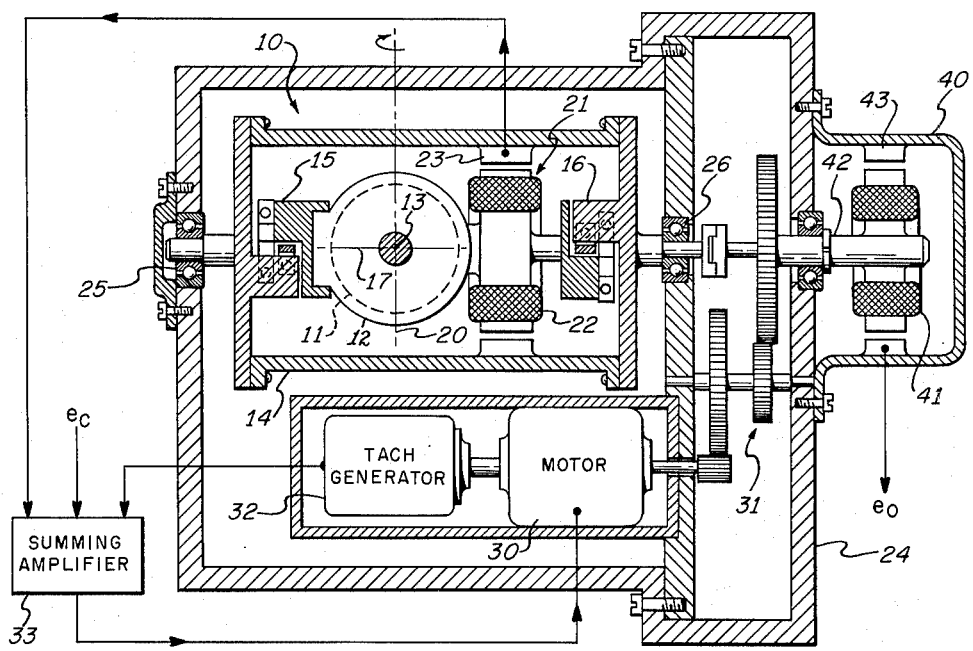
FIG. 2 is a schematic drawing of the gyroscope of FIG. 1 connected to provide a measure of the integral of the angular rate.

Referring now to FIG. 2, to provide a gyroscopic apparatus of the type shown in FIG. 1 which measures the integral of the angular velocity applied to the input axis 20, another pick-off 40 may be added thereto which may, for example, be a synchro. The synchro 40 has its rotor 41 connected to a shaft 42 extending from the gear train 31 while its stator windings 43 are mounted on the base 24. In this manner the pick-off 40 is responsive to the total rotation of the servomotor 30. Since the angular displacement of the housing 14 with respect to the rotor casing 12 is proportional to the time integral of the applied input rate, the pick-off 40 provides a signal representative of the integral of the angular velocity experienced by the rotor 11 about its input axis 20.

Figure 3:
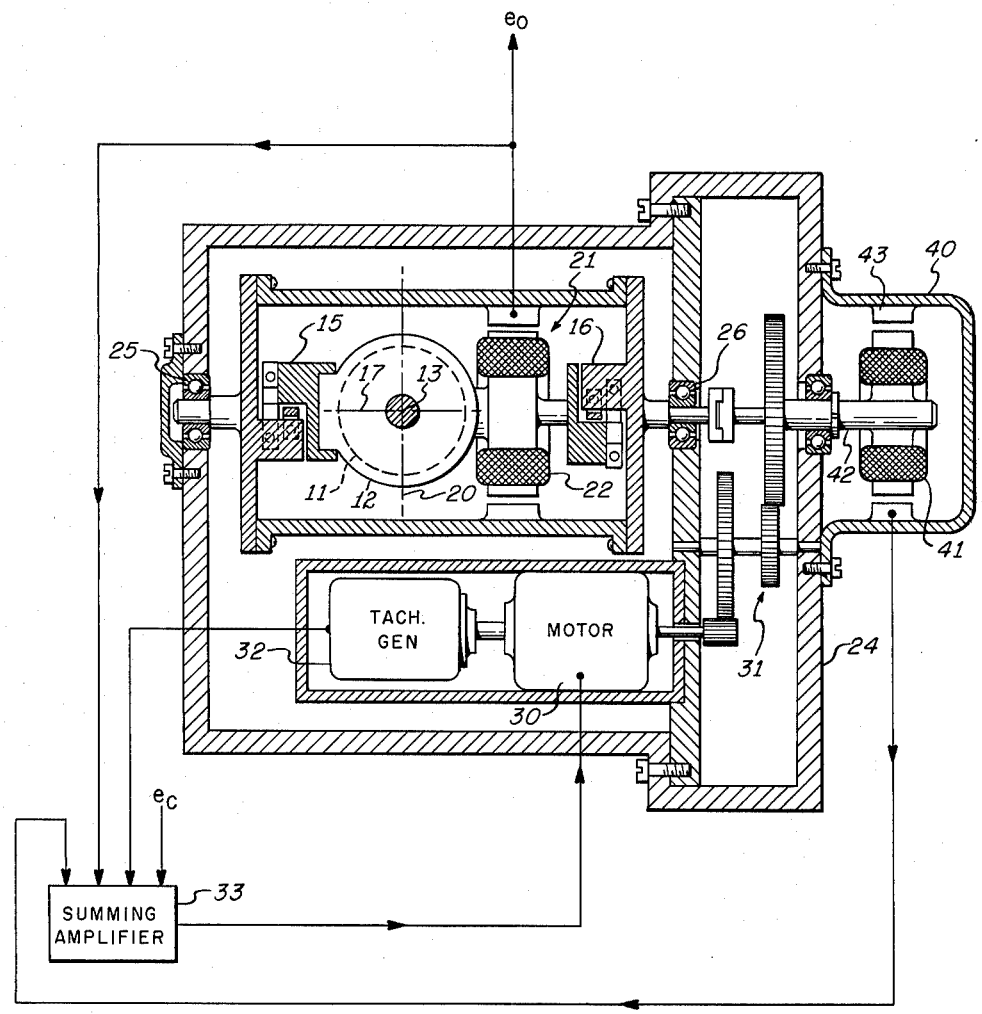
FIG. 3 is a schematic drawing of the gyroscope of FIG. 1 connected to provide a measure of the angular rate.

Referring now to FIG. 3, a rate gyro may be provided by connecting an output terminal of the synchro 40 of FIG. 2 to an input terminal of the summing amplifier 33. The output from the pick-off 21 is then a signal having an amplitude and phase representative of the magnitude and direction of the angular velocity about the input axis 20.

In any of the above described embodiments of the present invention, external commands may be introduced by inserting a command voltage, indicated as $e_c$, into the summing amplifier 33.

By means of the aforementioned arrangement, the mechanical package including the single-degree-of-freedom gyro 10 remains unchanged and thus can be economically mass produced and can be stored indefinitely. The only changes in the apparatus are relatively minor changes in the electrical connections. By means of these minor changes, gyroscopic apparatus is provided which provides a measure of the angular rate, the integral of the rate or the angular acceleration experienced by the apparatus. Further, by adding additional derivative obtaining means, angular displacement can also be measured.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Gyroscopic apparatus having mutually perpendicular input, output and spin axes comprising a rotatable hollow housing mounted for rotation about said output axis, a resiliently constrained rotor casing mounted within said housing, resilient constraining and mounting means for resiliently supporting said casing for rotation about said output axis within said housing, a gyroscopic rotor mounted within said rotor casing for spinning about said spin axis and for precession about said output axis in response to movement about said input axis against the resilient torque exerted by said resilient constraining and mounting means, said precession causing relative motion between said casing and said housing, pick-off means having one portion associated with said casing and another portion associated with said housing for providing a signal representative of the angular displacement therebetween about said output axis, and servomotor means responsive to said signal for rotatably driving said housing and thereby resiliently torquing said casing as a function of said signal in a direction tending to eliminate said signal whereby the precession resulting from an angular velocity experienced about said input axis of said apparatus is resiliently opposed by said resilient constraining and mounting means as a function of the operation of said servomotor.

2. Apparatus as described in claim 1 wherein said resilient constraining and mounting means comprises flexure pivot supports supporting said rotor casing in said housing for movement about said output axis.

3. Apparatus as described in claim 1 wherein said servomotor means includes a servomotor, a tachometer generator, a gear train and an amplifier, said servomotor being connected through said gear train to drive said housing and also being directly connected to drive said tachometer generator, said tachometer generator providing a rate signal, said amplifier being responsive to said pick-off signal and said rate signal and connected to control said servomotor in accordance with the algebraic sum thereof and an algebraic summation responsive to said pick-off signal and said rate signal for providing an output signal in accordance with the difference therebetween, whereby said output signal has an amplitude and phase representative of the magnitude and direction of the angular acceleration experienced by said rotor about said input axis.

4. Apparatus as described in claim 1 wherein said servomotor means includes a servomotor, a tachometer generator, a gear train and an amplifier, said servomotor being connected through said gear train to drive said housing and also being directly connected to drive said tachometer generator, said tachometer generator providing a rate signal, said amplifier being responsive to said pick-off signal and said rate signal and connected to control said servomotor in accordance with the algebraic sum thereof, and said apparatus further including a second pick-off connected to be responsive to the rotation of said housing by said servomotor for providing a signal representative of the integral of the angular velocity experienced by said rotor about said input axis.

5. Apparatus as described in claim 4 including means for connecting said second pick-off to said amplifier, said amplifier being responsive to said first and second pick-off signals and said rate signal and connected to control said servomotor in accordance with the algebraic sum thereof, whereby the signal from said first pick-off means is representative of the angular velocity experienced by said rotor about said input axis.

6. Gyroscopic apparatus comprising a gyroscopic rotor, a rotor casing within which said rotor is mounted for spinning about a first axis, a rotatable housing mounted for rotation about a second axis, said rotor casing being mounted on said housing for precession through an angle dependent upon the angular velocity experienced by said rotor about a third axis, said first, second and third axes being mutually perpendicular with respect to each other, spring means resiliently constraining said rotor casing on said housing for pivotal movement about said second axis, pick-off means having one portion associated with said casing and another portion associated with said housing for providing a signal representative of the angular displacement therebetween about said second axis, and means including motive means responsive to said signal and connected to drive said housing about said second axis in a direction tending to reduce said signal to zero.

References Cited by the Examiner
UNITED STATES PATENTS

| | | | |
|---|---|---|---|
| 1,324,128 | 12/1919 | Meitner | 74—5.47 |
| 2,752,790 | 7/1956 | Draper | 74—5.4 |
| 2,893,247 | 7/1959 | Stern et al. | 74—5.6 |
| 2,934,961 | 5/1960 | Katz | 74—5.4 |
| 2,967,430 | 1/1961 | Leighton | 74—5 |

BROUGHTON G. DURHAM, *Primary Examiner.*
DON A. WAITE, *Examiner.*